United States Patent [19]

Hofmeister

[11] 4,133,902

[45] Jan. 9, 1979

[54] PROCESS CHEESE WITH LIVER ADDITIVE

[75] Inventor: Josef Hofmeister, Moosburg, Fed. Rep. of Germany

[73] Assignee: Hofmeister Käsewerk OHG, Moosburg, Fed. Rep. of Germany

[21] Appl. No.: 781,504

[22] Filed: Mar. 25, 1977

Related U.S. Application Data

[63] Continuation-in-part of Ser. No. 681,582, May 20, 1976, abandoned.

[30] Foreign Application Priority Data

Apr. 29, 1975 [DE] Fed. Rep. of Germany ....... 2519087

[51] Int. Cl.$^2$ .................. A23C 19/00; A23C 19/12
[52] U.S. Cl. .................................... 426/582; 426/641; 426/646
[58] Field of Search ............... 426/582, 646, 656, 657, 426/641, 649

[56] References Cited

U.S. PATENT DOCUMENTS 3,962,483  6/1976  Schulz ................................ 426/582

OTHER PUBLICATIONS

Webb, et al. Byproducts of Milk, 2nd ed., The Avi Publishing Co., Inc., Westport, Conn. 1970 (pp. 190–193 & 308–311).

*Primary Examiner*—David M. Naff
*Attorney, Agent, or Firm*—Michael J. Striker

[57] ABSTRACT

Ground cheese is heated to a temperature of approximately 80° C and finely chopped raw liver, water, an emulsifier salt and spices are added to the molten mass to flash cook the liver. The mixture is then heated to at least 100° C and thereafter cooled down by addition of water to 100° C and packaged. In the finished product the overall liver content by weight is below 15%.

5 Claims, No Drawings

PROCESS CHEESE WITH LIVER ADDITIVE

CROSS-REFERENCE TO RELATED APPLICATION

This application is a continuation-in-part of may copending and commonly assigned patent application Ser. No. 681,582 having a filing date of May 20, 1976 and now abandoned.

BACKGROUND OF THE INVENTION

The present invention relates to a foodstuff. More particularly, this invention concerns a process cheese and a method of making same.

It is known to mix various additives with process cheese, by which is meant a normally spreadable or soft cheese made by blending several different types of cheese. For instance, ham, crabmeat or mushrooms are occasionally added to increase the taste. In addition various spices such as pepper, caraway, paprika, most vegetables, chives and the like are frequently mixed with process cheese. Such mixtures are usually intended to enhance the normally bland taste of process cheese.

Another well-known foodstuff often used as a sandwich filling or spread is liverwurst. The consumption of this product is far greater than the consumption of any similar product, and a person fond of liverwurst often will eat many pounds of it in the course of a single year. The principal disadvantage of liverwurst is that it has a fat content between 40% and 60% by weight. This means that a person who consumes a considerable amount of liverwurst is consuming approximately half its weight in fat. The obvious disadvantage of this is that the high caloric intake can make the consumer also fat, with all of the concomitant health problems.

It has been suggested to reduce the high fat percentage in liverwurst. This has been done by the reduction of the fat content to as low as 23% to 24% by volume. Such reduction has, however, the enormous disadvantage that the taste of the liverwurst also decreases considerably. Thus such low-fat liverwurst has an insignificant part of the market as those persons who favor liverwurst would often rather do without than eat the almost tasteless low-fat variety. What is more in this low-fat product the animal fat is replaced with albumin and carbohydrates. Thus, although low in fat, the liverwurst is nonetheless not a highly healthy or desirable foodstuff.

Another suggestion has been to obtain the desirably taste of liver in a food product which is as inexpensive and calory-low as processed cheese. All such attempts have required the use of considerable quantities of relatively expensive liver, so that the finished product is usually almost as expensive as standard liverwurst. Any attempt to reduce the liver content by weight to below approximately 30% has yielded a product of relative unpalateability, so that such attempts have typically been given up as hopeless.

SUMMARY OF THE INVENTION

It is therefore an object of the present invention to provide an improved foodstuff and method of making same.

Yet another object is to provide a low-fat and nutritionally valuable liverwurst replacement.

These objects are attained according to the present invention by mixing liver with process cheese. This liver is mixed in a ground form and has been surprisingly found to impart sufficient taste to the process cheese to satisfy virtually any liverwurst enthusiast.

Thus in accordance with the present invention a process cheese is formed by the conventional method, such as described in U.S. Pat. No. 1,389,577. In accordance with this known method a quantity of hard cheese is cleaned and ground. Water is added to the ground cheese and the mixture is heated to at least 80° C. Thereupon in accordance with this invention various additives such as emulsifying salts, spices, milk products including fat-free milk albumin, and finely chopped raw liver are added to the heated mixture. Thereafter the thus completed mixture is heated up to a temperature of at least 100° C., whereupon the meat albumin in the raw particles of liver harden. In this manner the liver in the process cheese appears as small particles. Thereafter the mass is cooled to below 100° C. and packaged.

It has surprisingly been found in accordance with this invention that it is possible to limit the cheese content to between 30% and 50% by weight and the liver content to between 10% and 15% by weight and still produce an extremely nutritive and tasty product. Indeed it is almost impossible to tell the difference between this product and standard liverwurst.

In accordance with this invention the foodstuff comprises by weight:
30%–15% cheese,
10%–15% liver,
15%–40% water,
0%–5% milk albumin
0%–3% emulsifier salts, and
0%–5% spices.

It is also possible to include butter and milk in the mixture with, however, the liver content in the finished product not being above 15%.

The above-described product is made by the steps of first mixing ground cheese and water and heating this mixture to at least 80° C. Thereafter, ground raw liver is added to the mixture which is thereafter heated to above 100° C. After a brief time at this temperature the entire mixture is cooled and packaged.

In the foodstuff according to this invention the fat content by volume is reduced by a factor of approximately 5 to between 5% and 15%, here 10%. Thus the product, due to its extremely low fat content, can form a part of even the most stringent diet.

The liverwurst according to the present invention has been found to have a taste which is virtually as good as that of a conventional high-fat liverwurst. At the same time its spreadability is virtually the same as that of normal liverwurst and even its cooler is close to that of normal liverwurst.

The animal albumin or proteins in the liverwurst are mainly replaced in the foodstuff according to this invention by milk albumin or protein. The animal fat is similarly replaced by milk fat with the simultaneous reduction of this fat to approximately a quarter of its original level. In addition it should be noted that milk albumin or proteins are nutritionally considered of substantially more value than the corresponding animal or meat albumin or proteins.

In addition to the above-given advantages the foodstuff according to the present invention is a great deal cheaper than normal liverwurst to produce. In fact it is possible to produce the liverwurst substitute in accordance with the present invention at a cost equal to approximately half the cost of a comparable quantity of normal liverwurst.

SPECIFIC DESCRIPTION

The cheese according to this invention is produced by first cleaning the hard cheeses that are used and then chopping them and milling them to very fine consistency. The thus-milled cheese is then charged into a steam-jacketed kettle or the like and heated to 90° C.

At this stage the desired spices, the necessary quantity of water, and the emulsifier salts are added to the hot molten cheese mass. In addition the necessary quantity of finely ground raw liver is added to the molten mass and the entire mixture is now continuously stirred. The addition of the finely chopped raw liver to the very hot molten cheese mass causes these raw liver particles to be flash cooked, that is each separate particle is almost instantaneously cooked. Thus the meat proteins in the liver contract together and the liver is left in the mass as separate particles which retain their taste. In this manner even a relatively small quantity of liver, indeed such a small quantity that the product still qualifies legally as processed cheese, imparts to the process cheese a very good flavor, hitherto unattainable with such a small percentage of liver. In addition the liver, which normally can spoil in a few hours, can be stored for long period of time.

After the above-described addition of the liver into the molten cheese mass the kettle is closed again and the entire mass is heated to almost exactly 110° C., while the mixture is intensively stirred. Thereupon, the mass is cooled back to 100° C. by the addition of more water which is stirred in. When the temperature has dropped again to 100° C. then the kettle is opened and the product is poured into the desired packages, normally into foil-lined molds in which the mass is cooled and from which foil-wrapped blocks of the product are then removed.

EXAMPLE I

Low Calory Liver-Flavored Cheesespread (All percentages are by weight and approximate.)
Overall fat content: 11%
Water content: 64%
Composition:
30% Cheshire hard cheese with 50% fat in dry matter,
15% Cheshire hard cheese with 20% fat in dry matter,
 3% fat-free milk albumin,
12% raw and finely chopped liver,
 1% emulsifier salt, here polyphosphate,
 4% spices, and
35% water.

EXAMPLE II

Standard Liver-Flavored Cheesespread

Overall fat content: 27%,
Water content: 53%.
composition:
29% Cheshire hard cheese with 50% fat in dry matter,
 7% Cheshire hard cheese with 20% fat in dry matter,
 3% fat-free milk albumin,
15% fresh butter,
12% fresh cream,
 3% spices,
 1% emulsifier salt, here polyphosphate,
13% finely chopper raw liver, and
17% water.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a cheese food having a taste closely resembling the taste of liverwurst, comprising the steps of
    (a) heating a mass of ground hard cheese to a temperature of at least 80° C.;
    (b) adding to the resultant molten mass of cheese water, emulsifier salts, and finely chopped raw liver particles to produce a mixture containing about 30–50% cheese, about 15–40% water and about 10–15% liver, said raw liver particles being substantially instantaneously cooked on contacting said molten cheese mass;
    (c) heating the resulting mixture containing cheese and liver to above 100° C.;
    (d) cooling the mixture; and
    (e) packaging the cooled mixture to obtain said cheese food.

2. The method defined in claim 1 wherein said mixture is heated in step (c) to 110° C.

3. The method defined in claim 2 wherein said mixture is cooled in step (d) by addition thereto of water to below 100° C.

4. The method defined in claim 3, further comprising the step of stirring the cheese and liver during steps (a), (b), and (c).

5. A cheese food produced by the process of claim 1.

* * * * *